United States Patent [19]

Brown et al.

[11] Patent Number: 4,853,310
[45] Date of Patent: Aug. 1, 1989

[54] TRIIODIDE SALTS OF CYANINE DYES SUITABLE FOR SENSITIZATION OF PHOTOCONDUCTIVE SYSTEMS

[75] Inventors: David E. Brown, St. Paul; Louis M. Leichter, Woodbury, both of Minn.

[73] Assignee: Minnesota Mining and Manufacturing Company, St. Paul, Mich.

[21] Appl. No.: 196,739

[22] Filed: May 20, 1988

[30] Foreign Application Priority Data

May 22, 1987 [GB] United Kingdom ................ 8712151

[51] Int. Cl.⁴ .......................... G03G 5/04; G03G 5/06
[52] U.S. Cl. .......................................... 430/83; 430/93
[58] Field of Search .................................... 430/83, 93

[56] References Cited

U.S. PATENT DOCUMENTS 4,337,305  6/1982  Beretta et al. ...................... 430/82
4,617,247  10/1986  Suzuki et al. ....................... 430/81

FOREIGN PATENT DOCUMENTS 59-217761  11/1984  Japan .
61-248789  8/1986  Japan .

OTHER PUBLICATIONS

J. Org. Chem., vol. 42, No. 5, 1977, "Stable Heptamethine Pyrylium Dyes that Absorb in the Infrared," G. A. Reynolds et al., pp. 885–888.

Zhurnal Organicheskoi Khimii, vol. 14, No. 10, pp. 2214–2221, Oct. 1978, Y. L. Slominskii et al., "Polymethine Dyes with Hydrocarbon Bridges" (Chlorine Substituted Tricarbocyanines).

Primary Examiner—Paul R. Michl
Assistant Examiner—Jeffery A. Lindeman
Attorney, Agent, or Firm—Donald M. Sell; Walter N. Kirn; Mark A. Litman

[57] ABSTRACT

Cyanine dyes, particularly indocyanine dyes, having at least 7 carbon atoms in the polymethine chain which may possess a fused cyclopentene or cyclohexene ring in the form of a tri-iodide salt exhibit a substantial reduction in the propensity to associate compared to dyes having the identical cation but different anion. The tri-iodide salts are particularly useful as sensitizers in organic photoconductor systems.

11 Claims, 4 Drawing Sheets

TRIIODIDE SALTS OF CYANINE DYES SUITABLE FOR SENSITIZATION OF PHOTOCONDUCTIVE SYSTEMS

FIELD OF INVENTION

This invention relates to dyes, to their preparation and use as sensitisers for photoconduction in organic photoconductors, particularly for photoconduction sensitization to the near infrared.

BACKGROUND TO THE INVENTION

The technology of electrophotography is commercially well established. A wide variety of processes and apparatus are used, although they have many characteristics in common. One of the more common forms of this technology involves the use of a plate having a photoconductive insulating layer, generally coated on a conductive layer. Imaging is effected by first uniformly electrostatically charging the surface of the photoconductive layer and then exposing the charged layer to an image or pattern of activating electromagnetic radiation, usually visible or ultraviolet radiation. This exposure selectively enables the charge in the irradiated areas of the photoconductive insulator to dissipate. The charge which remains in the non-irradiated areas forms a latent image which may be further processed to form a more permanent record of exposing image or pattern. The most common form of additional processing involves the attraction of particles of material selectively to the charged or uncharged areas and fusing them to the photoconductive layer or transferring the particles in their imagewise distribution to another surface to which they are more permanently bound by an adhesive or by fusion of the particles themselves. A common electrophotographic construction comprises, in sequence, a substrate, a conductive layer, and a photoconductive insulating layer.

Typical classes of photoconductive materials useful in electrophotography include (1) inorganic crystalline photoconductors such as cadmium sulphide, cadmium sulphoselenide, cadmium selenide, zinc sulphide, zinc oxide, and mixtures thereof, (2) inorganic photoconductive glasses such as amorphous selenium, selenium alloys, and selenium-arsenic, and (3) organic photoconductors such as phthalacyanine pigments and polyvinyl carbazole, with or without binders and additives which extend their range of spectral sensitivity. These systems are well known in the art. For example, U.S. Pat. No. 3,877,935 discusses various problems associated with the crystalline and amorphous classes of photoconductors and shows the use of polynuclear quinone pigments in a binder as a photoconductive layer. U.S. Pat. No. 3,824,099 shows the use of squaric acid methine sensitizing dyes and triaryl pyrazoline charge transport materials as an electrophotographic construction. The use of poly-N-vinylcarbazole as a photoconductive insulating layers is disclosed in U.S. Pat. No. 3,037,861. A number of diverse organic photoconductors have been disclosed since the development of the carbazole class of photoconductors such as quinones and anthrone [e.g., Hayashi et al., *Bull. Chem. Soc. Japan*, vol 39, (1966) pp. 1670–73], but the carbazoles have continued to attract the greatest attention. Other carbazole photoconductors are disclosed in U.S. Pat. No. 4,025,341, Xerox Disclosure Journal, Vol 3, No. 1, Jan/Feb 1978, page 7, Japanese Patent Publication No. 52-34735 and European Patent Publication No. 58840.

Organic photoconductors have been spectrally sensitised with a wider range of sensitising dyes such as triarylmethane dyes, disulphone dyes, quinazoline dyes, polyquinoid dyes, polyanthraquinoic dyes, pyrylium-based dyes and cyanine dyes. Examples of the use of indocyanine derivatives as sensitising dyes are disclosed in U.S. Pat. Nos. 4,617,247 and 4,362,800.

Double layer organic photoconductor systems comprising separated but contiguous charge carrier generating (CGL) and charge carrier transporting layers (CTL) are well known. In such function separated constructions, the CGL absorbs incident light and generates charge carriers with subsequent injection of appropriate polarity carriers into the CTL wherein they migrate and neutralise charges of opposite polarity at the surface. Since all viable charge transport materials are hole transporting, conventional bi-layer organic photoconductors in which the CTL overlies the CGL are sensitive only to negative charging. Negative corona charging is less stable in discharge as compared to positive charging and, additionally, produces large amounts of ozone which is not only environmentally undesirable but can also cause chemical changes on the organic photoconductor surface. Inverted structures, in which CGL overlies the CTL, would be sensitive to positive charging; but the practical problems involved in protecting the thin CGL from damage during storage and use makes the fabrication of such designs extremely difficult.

Single layer organic photoconductor materials in which a sensitising dye is uniformly dissolved or dispersed within the CTL matrix are sensitive to positive charging; but these have been found to be suitable only for single use of very limited re-use owing to their relatively poor maintenance of stable electrophotographic responses during recycling.

It has been found that the association e.g. dimerisation, of sensitising dyes in organic photoconductor coatings can result in the formation of charge carrier traps which have a detrimental effect on recycling of the photoconductor for reuse in imaging procedures and adversely affect photoresponse properties. In particular it has been observed that both charge acceptance decreases and that photosensitivity increases following a charge and discharge cycle. The time required for re-establishment of the initial charged state varies from minutes to many hours depending upon the particular dye used and its concentration.

It has now been found that a particular class of sensitising dye has little propensity for association in organic photoconductors, thereby greatly improving the stability of the photoreceptor response characteristics during electrophotographic recycling.

SUMMARY OF THE INVENTION

Therefore according to one aspect of the present invention there is provided a photoconductor composition comprising an organic photoconductor compound in admixture with a sensitising dye in which sensitising dye is a cyanine dye having at least 7 carbon atoms in the polymethine chain which may have a fused cyclopentene or cyclohexene ring, and at least 10 molar percent, preferably at least 30 molar percent, of the dye is in the form of tri-iodide salt.

Preferred dyes for use in the invention are of the general formula in which:

n and m are 0 or integers such that (n+m) is at least 2, each $R^1$ independently represents a substituent of up to 20 carbon atoms selected from optionally substituted acyclic hydrocarbon groups preferably aliphatic, such as an alkyl group (including substituted alkyl), preferably containing from 1 to 13 carbon atoms, e.g. methyl, ethyl, propyl, isopropyl, butyl, sec-butyl, hexyl, cyclohexyl, dodecyl, octadecyl, hydroxyalkyl (e.g. omega-hydroxyethyl, omega-hydroxypropyl, etc.), and alkenyl substituents, such as allyl, 1-propenyl, 2-propenyl, 1-butenyl, 2-butenyl and 3-butenyl, etc.; alkaryl groups such as benzyl and betaphenylethyl; and aryl groups e.g. phenyl, p-tolyl, o-tolyl, 3,4-dichlorophenyl, etc., A is selected from —CH=CH—CH= in which $R^2$ is selected from hydrogen, halogen, preferably chloro and bromo, cyano, alkyl, generally with no more than 18 preferably no more than 4 carbon atoms, alkoxy of up to 18 carbon atoms preferably with no more than 4 carbon atoms, phenoxy, and aryl of up to 20 carbon atoms, e.g., phenyl, naphthyl, thienyl, tolyl, amino e.g., $NH_2$, methylamino, diethylamino, phenylamino, methylphenylamino, morpholino, thiophenyl, thioalkyl, preferably with no more than 4 carbon atoms, the chloro substituents being most preferred, $R^{10}$ represents one or more ring substitutents selected from alkyl groups of up to 4 carbon atoms e.g. methyl, or tert-butyl, aryl of up to 12 carbon atoms e.g phenyl, cyano, halogen, e.g. bromo, and hydrogen each Y is independently selected from S and $CR^3R^4$ in which $R^3$ and $R^4$ independently represent a substituted or non-substituted, aliphatic group of up to 20 carbon atoms, such as an alkyl group of from 1 to 12 carbon atoms, e.g., methyl, gamma-sulphopropyl, isopropyl, butyl, sec-butyl, ometa-sulphobutyl, dodecyl, beta-hydroxyethyl, gammahydroxypropyl, beta-methoxyethyl, beta-ethoxyethyl, allyl, benzyl, beta-phenylethyl, beta-carboxyethyl, carboxymethyl, gamma-carboxypropyl, beta-acetoxyethyl, beta-acetoxypropyl, carbomethoxymethyl, and carboxyethoxyethyl, or $R^3$ and $R^4$ together represent the necessary atoms to complete a 5- or 6-membered carbocyclic ring, each Z independently represents one or more substituents selected from hydrogen, halogen, nitro, cyano, optionally substituted alkylsulphonyl generally of up to 12 carbon atoms, optionally substituted aryl sulphonyl generally of up to 12 carbon atoms and optionally substituted arylcarbonyl generally of up to 12 carbon atoms, preferably each Z is in the 5-position and is phenylsuphonyl, or benzoyl and

$X^-$ represents a tri-iodide anion.

According to a second aspect of the invention there is provided a photosensitive element comprising a support, the surface of which is electrically conducting or is made electrically conductive by the provision of a conductive layer, the electrically conductive surface having coated thereon a photosensitive layer comprising an organic photoconductive material and as a sensitiser a dye of formula (I).

Tri-iodide salts of cyanine dyes are believed to be new and form a further aspect of the invention.

The tri-iodide salts of formula (I) exhibit a substantial reduction in the propensity to associate compared to dyes having the same cation but different anions e.g. perchlorates, iodides, tetrafluoroborates, etc.. Furthermore, the tri-iodide salts exhibit an increased extinction coefficient when incorporated in coatings. The dyes of formula (I) find particular utility in organic photoconductor coatings acting as efficient sensitisers.

Particularly preferred dyes for use in the invention are compounds of the formula (II)

in which:

$X^-$ represents a tri-iodide anion, $R^{10}$ is as defined above, and $R^5$ represents an electron withdrawing group such as $C_6H_5SO_2$, $CF_3SO_2$, $CH_3SO_2$, $NO_2$ or $C_6H_5OSO_2$.

The cation portion of the dyes of formula (I) may be prepared by techniques known in the art. It has been found that the iodide ion in acetic anhydride and/or acetic acid is readily converted to the tri-iodide species, presumably via a process involving air oxidation. Since the final coupling reaction in the preparation of the indole cyanine dyes is carried out in such a solvent, the presence of iodide in the mixture can give high yields of the tri-iodide dye salt.

Alternatively, dyes produced as salts having anions such as $ClO_4^-$ or $I^-$ can be converted to their $I_3^-$ salts by recrystallisation in the presence of an excess of a soluble tri-iodide such as tetrabutylammonium triiodide.

The organic photoconductors used in the photosensitive materials of the invention may comprise any of the materials known in the art. A class of photoconductor for which the dyes of formula (I) are particularly useful is the bis(benzo-[a]carbazolyl)aryl methanes, which are excellent charge transport photoconductors. Photoconductive systems incorporating these compounds are disclosed in European Patent Publication No. 58840 and U.S. Pat. No. 4 362 800.

Various binder materials known in the art are useful with electronically active donor compounds useful in the present invention. It is preferred that the binder be essentially optically transparent, particularly in the region in which the dye absorbs. Suitable binders include poly(vinyl chloride), poly(siloxanes), poly(vinyl butyral), poly(vinyl acetate), styrene/acrylonitrile copolymers, polyacrylates, polymethacrylates, polycarbonates, polyepoxides, polyurethanes, polyamides, polyethers, polyesters, polyolefins, as well as block, graft, random and alternating polymers, copolymers, terpolymers and mixtures thereof. The binders themselves are preferably electrically insulating film-forming polymers suitable for the formation of electrophotographic layers. The preferred polymeric binders are polycarbonates, polyacrylates, polyesters and styreneacrylonitirile copolymers. Coating aids, lubricants, surface active agents, other sensitising dyes and other adjuvants may be added to the composition.

For use of the materials of the present invention in electrophotographic layers, organic photoconductor compounds should be present as at least 15% by weight of the composition. Preferably the photoconductor compound should be present in the range 35 to 55% by weight of the layer, and may comprise up to 100% by weight of the layer, excluding the sensitiser dye. The sensitising dyes should be used in amounts which will increase the sensitivity of the composition. This is defined as an effective sensitising amount of dye. Generally amounts of from 0.01 to 10% by weight dye relative to the weight of the dry layer may be used. Amounts of dye as small as 0.0005% by weight can increase the sensitivity of the electron donor compounds. Preferred concentration ranges are from 0.01 to 5% by weight.

The dyes of formula (I) may be incorporated into the photoconductor material by techniques known in the art. For example the photoconductor compound may be dissolved in the solvent such as a mixture of monochlorobenzene and methylene chloride and the compound of the formula (I) dissolved in a solvent, for example, chloroform or a mixture of chloroform and dimethyl-formamide, the resulting solutions being mixed with each other, and the mixture is formed into a film or coated on a support and dried to form a film.

Suitable supports for the photosensitive element of this invention include a transparent conductive film such as a polyethylene terephthalate film having a thin layer of a conductive metal formed by vacuum-deposition, a metal plate, e.g. aluminium plate and copper plate, and coated with a conductive film.

The photosensitive materials of the present invention may also be useful as photoconductive toners, photovoltaic devices, organic semiconductors, and the like, and may use concentrations of organic electron donor compounds as low as 5% by weight.

The photosensitive elements are utilized by imposing a uniform electrostatic charge on the surface of the insulating layer, exposing the charged surface imagewise to light to dissipate the charge only in the light-struck areas thereby forming an electrostatic image on the surface. The charge pattern produced by the exposure is then developed by electrostatic toner, or alternatively is transferred to another surface and thereafter similarly developed. Either the charged or uncharged areas may be developed.

DETAILED DESCRIPTION

The invention will now be illustrated by the following Examples.

EXAMPLE 1

(a) Preparation of tetrabutylammonium tri-iodide (TBATI)

Tetrabutylammonium iodide (1.0 g) was dissolved in 2.0 ml of methanol at room temperature. Iodine (0.688 g) dissolved in methanol (7.0 ml) was added to the iodide solution when, on mixing, dark reddish-black crystals immediately separated. After twice washing with methanol this crystalline material was dried at 50° C. to constant weight. Yield 1.40 g of TBATI (83%). Melting point 70.5 to 71.5° C.

Found: C=30.65%, H=5.75%; N=1.92%; I=61.2% $C_{16}H_{36}NI_3$ requires: C=30.84%; H=5.82%; N 2.25%; I=61.09%

(b) Preparation of indocyanine tri-iodide salts from the perchlorate salts by precipitation in the presence of an excess of the $I_3^-$ ion.

Tetrabutylammonium tri-iodide ($25 \times 10^{-3}$ moles) and the perchlorate salt of Compound No. 1 reported in Table 1 ($2.25 \times 10^{-3}$ moles) were dissolved in dichloromethane (100 ml). The volume of solvent was reduced to about 50 ml on a steam bath when 50 ml of methanol were added to the solution. Further reduction of the resultant methanol/dichloromethane solvent mixture on a steam bath (to about 50 ml) resulted in the formation of dye crystals. The solution was then removed from the steam bath and allowed to cool to ambient temperature. The precipitated dye crystals were filtered, twice washed with methanol and, finally, recrystallised from a methanol dichloromethane solvent mixture to give 1.7 g of the triiodide dye salt of Compound 1 (Yield—64%). Found: C=46.82%; H=4.06%; N=2.0%; Cl=2.96%; I=32.08%: $C_{46}H_{48}N_2ClS_2O_4I_3$ requires; C=47.09%; H=4.12% N=2.38%; Cl=3.02%; I=32.45%.

(c) Preparation of tri-iodide salts during the coupling reaction in acetic anhydride.

Acetic anhydride (100 ml), 1-ethyl-2,3,3-trimethyl-5-phenylsulphonyl indolenium iodide (10 g) and 2-chloro-1-formyl-3-hydroxymethylene cyclohexene-6-aldehyde were heated at 80° C. for 8 hours. After cooling the reaction mixture to ambient temperature, methanol (200 ml) was added to the reaction mixture. The precipitated dye crystals were filtered, washed with methanol, then twice recrystallised from a dichloromethane/methanol solvent mixture to give 2.1 g dye. Spectrophotometric analysis indicated than anion content of this dye was 75% triiodide and 25% iodide (figures ±5%).

Found: I=27.4%; Cl=3.78%. Expected for 3:1 triiodide:iodide: I=27.8%; Cl=3.65%.

The tri-iodide salts of Compounds 1 to 5 in the following Table 1 were prepared from the perchlorate salts by the method (b) described above. The compounds were of Formula (II) defined herein in which $R^{10}$ is hydrogen.

TABLE 1

| COMPOUND NO. | $R^5$ |
|---|---|
| 1 | $PhSO_2$ |
| 2 | $CF_3SO_2$ |
| 3 | $PhOSO_2$ |
| 4 | $CH_3SO_2$ |
| 5 | $NO_2$ |

Identification and estimation of the tri-iodide ion in indocyanine dyes.

Qualitatively, the tri-iodide ion species was detected using thin layer chromatography, elemental analysis and difference spectra. Quantitative data on the amounts of tri-iodide present in individual dyes was obtained from uv/visible spectral analysis and/or elemental analysis.

Thin-layer chromatography (TLC) of the indocyanine tri-iodide dye salts

The tri-iodide dye salts reported in Table 1 were dissolved in acetone and samples of each solution were "spotted" onto reversed phase TLC plates (Whatman Chemical Separations Ltd., type KC18F). After drying, the plates were developed in solvent comprising methanol (90 parts), water (8 parts) and glacial acetic acid (12 parts). In each case, the tri-iodide ion separated as a bright yellow spot ($R_F$=0.93), the identity of which was confirmed by extraction into dichloromethane: acetic acid (4:1) solvent mixture and comparison of its uv/visible absorption spectrum with that of an authentic tri-iodide salt (tetrabutylammonium tri-iodide) in the same solvent.

Figure 1:
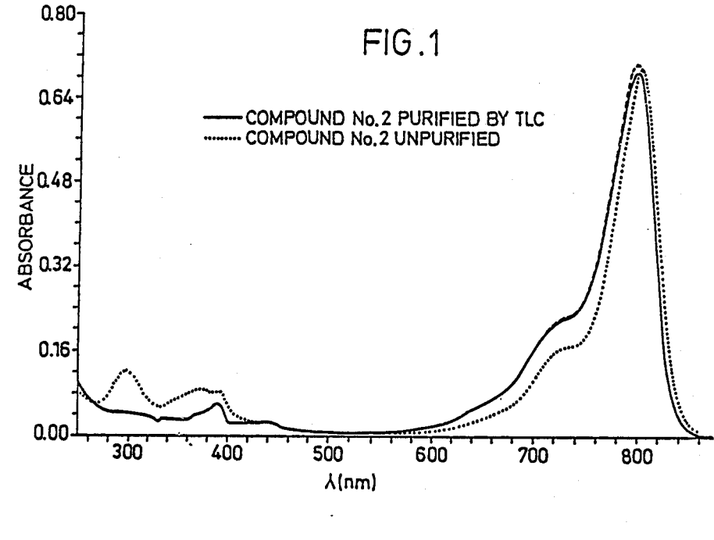
FIG. 1 is the UV/visible absorption spectrum of the tri-iodide salt of Compound No. 2 purified by TLC.

The $R_F$ values for the cationic dye species were as follows: Compound 1 ($R_F$=0.46), Compound 2 ($R_F$=0.35), Compound 3 ($R_F$=0.38) and Compound 4 ($R_F$=0.67). The uv/visible absorption spectra of the dyes before and after TLC separation showed changes consistent with the loss of $I_3^-$ in chromatographic materials; an example is shown in FIG. 1 of the accompanying drawings in which the concentration of Compound No. 2 was $3\times10^{-5}$ molar in $CHCl_3$ solution, 0.1 cm pathlength cell.

Estimation of tri-iodide in indocyanine dye salts from the uv/visible absorption spectra Anions such as $ClO_4^-$ and $I^-$ do not contribute significantly to the absorbance of the indocyanine dyes at 294 nm or 364 nm (solvent: dichloromethane containing 20% glacial acetic acid). The only contributors to the absorbance at either of these wavelengths will be from the dye cation and the $I_3^-$ anion. Using the extinction coefficients for $I_3^-$ and the dye cations obtained from TBATI and indocyanine dye perchlorate solutions, the $I_3^-$ content of a dye can be calculated from:

$$f = [(A/m) - (^{\epsilon}D/M_1)]/[(^{\epsilon}T/M_2) + (^{\epsilon}D/M_2) - (^{\epsilon}D/M_1)]$$

in which:
f = fractional content of $I_3^-$ salt.
A = absorbance of dye solution at any wavelength greater than 270 nm.
m = concentration of dye in $g.dm^{-3}$.
$^{\epsilon}D$ = extinction coefficient of dye at that wavelength.
$^{\epsilon}T$ = extinction coefficient of $I_3^-$ at that wavelength.
$M_1$ = molecular weight of the dye perchlorate salt (or iodide etc. as appropriate).
$M_2$ = molecular weight of the $I_3^-$ salt of the dye.

The above method was used to estimate the $I_3^-$ content in several indocyanine dye samples prepared via procedure (c) followed by anion exchange of residual $I^-$ by $ClO_4^-$: these results are given in Table 2.

TABLE 2

| Compositions of various indocyanine dyes as estimated by uv/visible absorption spectroscopy | | |
|---|---|---|
| Compound No. | mole % as $I_3^-$ salt (± 5%) | mole % as $ClO_4^-$ salt (± 5%) |
| 4 | 75 | 25 |
| 3 | 85 | 15 |
| 2 | 90 | 10 |
| 1 | 75 | 25 |

EXAMPLE 2

Photoconductor materials

Figure 2:
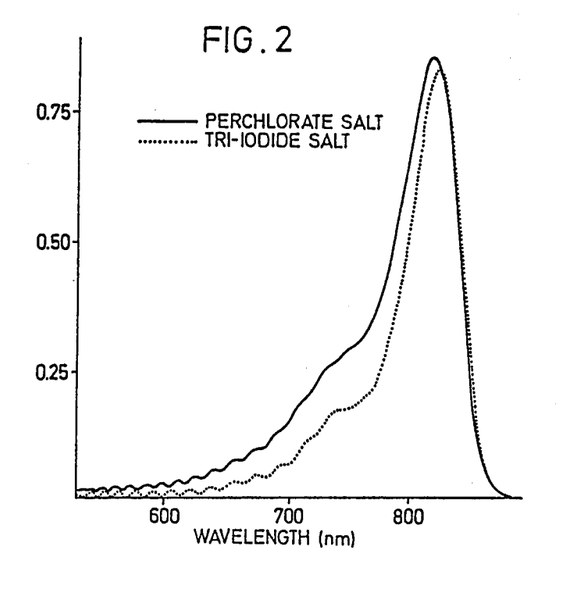
FIG. 2 is the UV/visible absorption spectra for layers containing the perchlorate and tri-iodide salts of Compound No. 2 dispersed in a polyester binder resin.
Figure 3A:
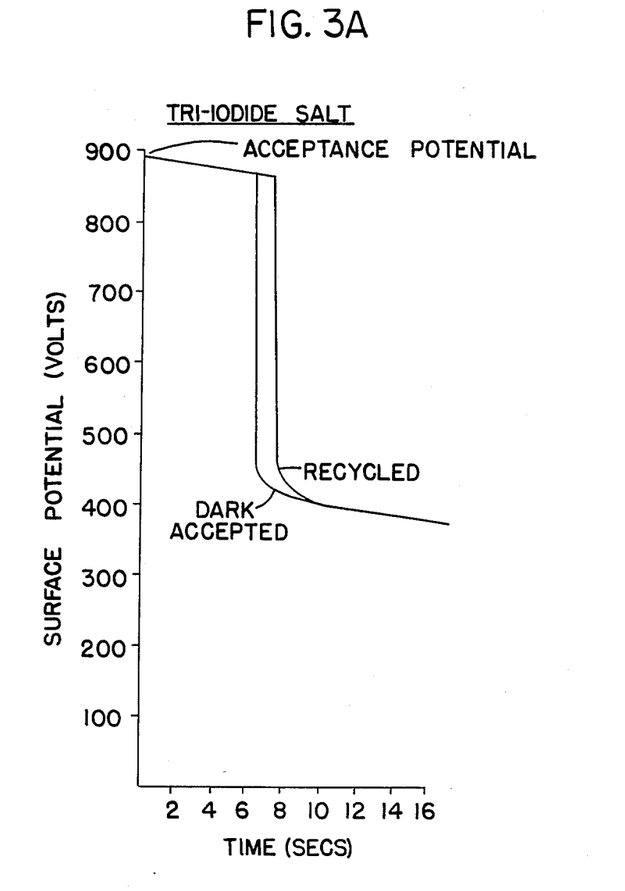
FIGS. 3A and 3B illustrates the photoconductive response for layers containing the perchlorate and tri-iodide salts of Compound No. 2 dispersed in a polyester binder resin.
Figure 3B:
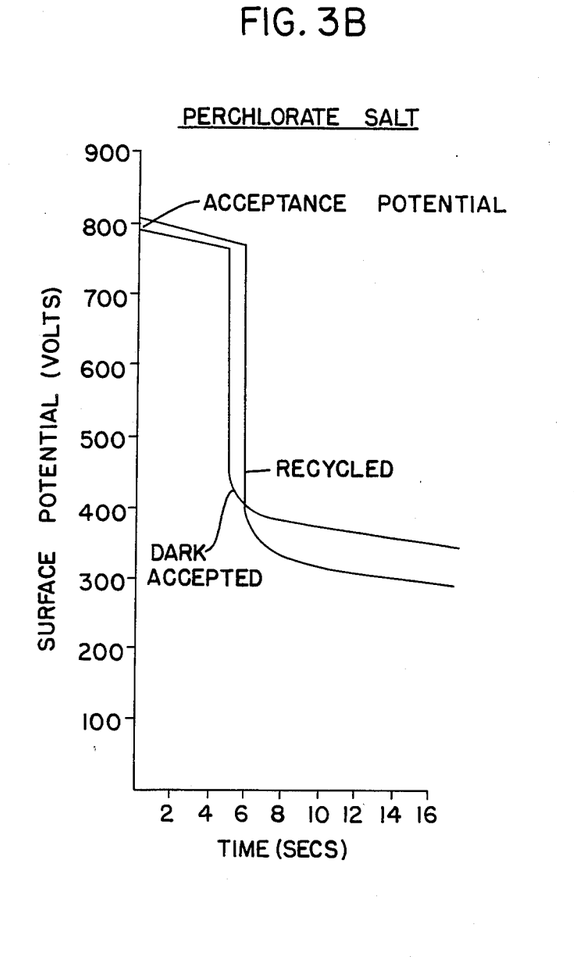

The absorption spectra for layers (9.0 micron thick) containing 50% (w/w) bis-(N-ethylbenzo-1,2-carbazolyl)phenylmethane (BBCPM) and 0.5% (w/w) of the tri-iodide and perchlorate salts of Compound No. 2 in Goodyear Company Vitel PE200 (polyester) resin binder are shown in FIG. 2 of the accompanying drawings. The higher absorbance for the short wavelength shoulder at 750 nm exhibited by the perchlorate salt is indicative of a greater degree of dye association. The photoconductive response of these layers is shown in FIGS. 3A and 3B of the accompanying drawings where the enhanced stability of both charge acceptance and photoresponse following a charge/discharge cycle is apparent for the layer sensitised with the tri-iodide dye salt. Here the flash exposure intensity was 38 erg/cm² at 820 nm and 5 minutes dark adaption was allowed between cycles.

EXAMPLE 3

Table 3 compares the cycling stability of a similar pair of samples to those in Example 2 sensitised with either the perchlorate salt or the tri-iodide salt of Compound No. 1. In these evaluations a continuous, unfiltered source of illumination derived from a hot filament lamp supplying about $4\times10^{-3}$ watts/cm² at the sample surface was used. The samples were charged for 10 seconds (6.0KV corona, 1.0KV grid), allowed to dark decay for 3 seconds, exposed to the light source for 10 seconds then dark adapted for 50 seconds before recycling.

As indicated in Table 3, the photoconductor layer sensitised with perchlorate dye salt showed a significant loss of charge acceptance on recycling whereas the sample sensitised with the tri-iodide dye salt gave a constant charge acceptance under the same conditions. Also significant is the lower rate of dark decay observed for the layer sensitised with the tri-iodide dye salt.

Figure 4:
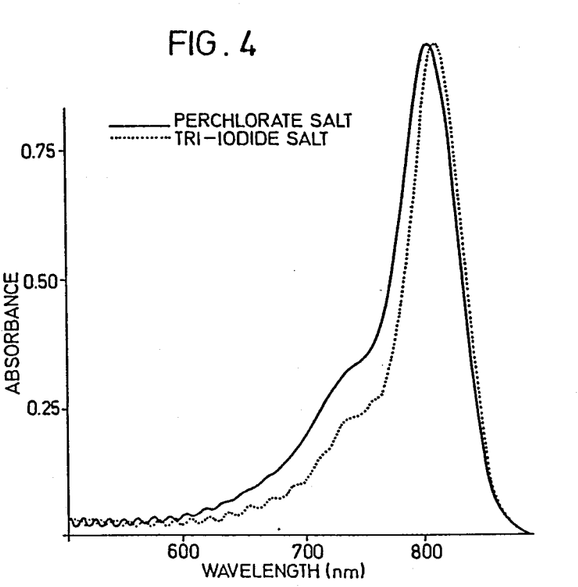
FIG. 4 is the UV/visible absorption spectra of a photoconductor layer sensitized with the perchlorate salt and tri-iodide salt of Compound No. 1.

The absorption spectra for these two layers are shown in FIG. 4 where, again, the lower absorbance of the short wavelength at 750 nm shoulder is indicative of a reduced degree of dye association.

TABLE 3

Initial surface voltage ($V_s$) and dark decay rate (DD).

| | Perchlorate salt | | Tri-iodide salt | |
|---|---|---|---|---|
| Cycle No. | $V_s$(volts) | DD(volts/sec) | $V_s$(volts) | DD (Volts/sec) |
| 1 | 955 | 5.2 | 975 | 2.5 |
| 3 | 895 | 7.4 | 975 | 4.3 |
| 5 | 850 | 9.4 | 980 | 5.5 |
| 7 | 830 | 11.8 | 980 | 5.8 |
| 9 | 805 | 12.5 | 975 | 5.8 |

EXAMPLE 4

This Example describes the preparation of dyes of the general formula:

| Compound No. | $R^5$ | $R^{11}$ | $R^{12}$ |
|---|---|---|---|
| 6 | $NO_2$ | $t$-$C_4H_9$ | H |
| 7 | $NO_2$ | H | $CH_3$ |
| 8 | $PhSO_2$ | $t$-$C_4H_9$ | H |

Preparation of 5-tert-butyl-2-chloro-1-formyl-3-hydroxymethylene-cyclohexene Intermediate (D)

Into a 500 ml 3-necked round bottomed flask equipped with magnetic stirrer, nitrogen blanket, condenser, thermometer and pressure-equalizing addition funnel, was placed 40 ml (37.76 g, 0.517 mol) of dry dimethyl-formamide. The material was cooled in an ince bath and 37ml (60.87 g, 0.400 mol) of phosphorus oxychloride was slowly added over 45 min through the addition funnel. The temperature was kept at 10° to 15° C. throughout the addition. Upon completion of the addition, the ice bath was removed, replaced with a water bath, and the reaction mixture allowed to warm to room temperature. The reaction was then kept at room temperature for 30 min.

To the thus formed Villsmeier adduct was slowly added a solution of 7.42 g (0.10 mol) of 4-tertiary-butyl-cyclohexanone in 55 ml of dry dimethyl-formamide (DMF). This addition was carried out using a clean pressure-equalizing addition funnel. A water bath was kept under the reaction vessel to control the exotherm. The addition was carried out over 30 min and the final temperature was 30° C. The water bath was removed, replaced by a heating mantle and the orange solution kept between 50° and 60° C. for 3 hours.

The orange-red solution was poured onto 300 ml of ice, 200 ml of water was added, and the solution stirred. After about 20 min, a yellow precipitate began to develop. A yellow mass also formed. The reaction was allowed to stir overnight. The crude product was filtered off, redissolved in DMF and reprecipitated into water to give the product. The yellow powder was filtered off and washed with copious amount of water until the washings were neutral to pH paper. The material as vacuum dried, dried in air, and finally dried in a vacuum oven at 50° C. to afford 15.80 g (68% of pure product, melting point=154° to 157° C.). TLC indicated the compound to be very pure. IR, UV and NMR were in agreement with the proposed structure.

Intermediated (A) to (C) disclosed hereinafter are prepared by analagous methods using the appropriate substituted cyclohexanone.

Preparation of Compound No. 6

Into a 250 ml beaker were placed 5.41 g (0.015 mol) of 1-ethyl-2,3,3-trimethyl-5-nitroindolenium iodide, 1.72 g (0.0075 mol) of Intermediate (D), 50 ml of acetic acid, and 50 ml of acetic anhydride. A magnetic stirrer was added and stirring and heating were begun. Heating to boiling resulted in a dark brown solution which turned green as the reaction occurred. Boiling for 30 min followed by cooling to room temperature resulted in crystallization of the dye as fine yellow crystals. Drying in vacuo afforded 5.12g of pure dye; melting point 193° C. (dec), λmax=803 nm. IR, UV and NMR spectra were in agreement with the proposed structure. Mass spectrum of the compound gave a positive ion at 657 amu indicative of the cation portion of the molecule. An additional cationic peak at 750 amu indicated that some of the chlorine in the central ring had been replaced with iodine. Negative ions found at 127 and 381 amu are indicative of the tri-iodide anion.

Preparation of Compound No. 7.

This dye was prepared in an identical manner to Compound No. 6 from 5.41g (0.015 mol) of 1-ethyl-2,3,3-trimethyl-5-nitroindolenium iodide and 1.40 g (0.0075 mol) of 6-methyl-2-chloro-1-formyl-3-hydroxymethylenecyclohexene (Intermediate C) (melting point=135° to 137° C.). The yield was 3.64 g; melting point=246° C. (dec), max=801 nm. IR, UV and NMR Spectra were in agreement with the proposed structure. Mass spectrum of the compound gave a positive ion at 615 amu indicative of the cation portion of the molecule. An additional cationic peak at 707 amu indicated that some of the chlorine in the central ring had been replaced with iodine. Negative ions found at 127 and 381 amu are indicative of the tri-iodide anion.

| | C | H | N | Cl | I |
|---|---|---|---|---|---|
| calcu- | 42.16 | 4.04 | 5.62 | 3.56 | 38.2 |

| | C | H | N | Cl | I |
|---|---|---|---|---|---|
| lated | | | | | |
| found | 41.3 | 3.9 | 5.5 | 3.4 | 39.6 |

Preparation of Compound No. 8

This dye was prepared in an identical manner to Compound No. 7 from 4.55 g (0.01 mol) of 1-ethyl-2,3,3-trimethyl-5-phenylsulfonylindolenium iodide and 1.14 g (0.005 mol) of Compound (A). The yield was 3.22 g; melting point=200° C. (dec), λmax=796 nm. IR, UV and NMR Spectra were in agreement with the proposed structure. Mass spectrum of the compound gave a positive ion at 847 amu indicative of the cation portion of the molecule. An additional cationic peak at 939 amu indicated that some of the chlorine in the central ring had been replaced with iodine. Negative ions found at 127 and 381 amu are indicative of the tri-iodide anion.

| | C | H | N | Cl | I |
|---|---|---|---|---|---|
| calculated | 48.85 | 4.59 | 2.28 | 2.88 | 30.97 |
| found | 50.70 | 4.8 | 2.3 | 3.3 | 27.1 |

EXAMPLE 5

Preparation of and Evaluation of Photoconductive Samples

Five solutions were prepared each containing the following materials;
0.600 g: Vitel PE-200 polyester resin
0.400 g: BBCPM
4.5 g: Dichloromethane
4.5 g: 1,2-Dichloroethane To solutions 1, 2 and 3 were added 0.065 g of Compound Nos. 5, 6 and 7 respectively. To solutions 4 and 5 were added 0.0050 g of Compound Nos. 1 and 8 respectively. All solutions were ~6.5×10$^{-6}$M in dye (if the dye were the iodide).

Each coating was made in a 5 inch (12.7 cm) wide strip of aluminized polyester using a 4 inch (10.2 cm) wide knife coated set at a wet thickness of 4 mil (100μ). Each coating was air dried and then oven dried at 80° C. for 15 min. The dry thickness was approximately 10μ.

The sample was charged for 4 sec, allowed to dark decay for 2 sec and then exposed to light of 820 and 830 nm for 10 sec. The amount of energy needed to half discharge the photoconductor is taken as a measure of the photosensitivity of the photoconductor. Results are shown in the following Table.

TABLE

| Compound No. | Charge Acceptance | Energy to Vo/2 ergs/cm$^2$ | |
|---|---|---|---|
| | | at 820 nm | at 830 nm |
| 5 | 700 V | 79.9 | 58.1 |
| 6 | 750 V | 80.9 | 78.5 |
| 7 | 750 V | 48.1 | 53.8 |
| 1 | 775 V | 65.6 | 62.2 |
| 8 | 725 V | 105. | 124. |

Vo is the initial charge acceptance voltage.

EXAMPLE 6

The following dyes were used in this Example: Compound No. 9:

Compound No. 10:

Compound No. 11:

A 20% by weight solution of polymethyl methacrylate (Elvacite 2008) Low Mol. Wt) was prepared in a solvent mixture comprising 30% dimethyl formamide and 70% chloroform.

0.5% w/v solutions of the Compound Nos. 9, 10 and 11 were then prepared.

To a separate set of 0.5% solutions of Compound Nos. 9 to 11 was added tetrabutylammonium tri-iodide in equimolar ratio to the compound.

Coatings of these six solutions were then made on polyester base at 100 micron wet thickness, using a wire wound rod. After drying transmission spectra were run between 400 and 800 nm.

The ratio of absorbances of the peak and shoulder was measured and the results are reported in the following Table.

TABLE

| Compound No. | max peak nm | max shoulder nm | peak/shoulder absorbance |
|---|---|---|---|
| 9 | 740 | 695 | 1.14 |
| 9 plus tri-iodide | 740 | 695 | 1.37 |
| 10 | 770 | 675 | 1.09 |
| 10 plus tri-iodide | 770 | 675 | 1.21 |
| 11 | 734 | 680 | 0.96* |
| 11 plus tri-iodide | 734 | 680 | 1.12 |

*690 nm absorbance shows a shoulder in absence of tri-iodide, which increases on tri-iodide addition.

These results indicate addition of tri-iodide causes an increase in absorbance ratio and this is consistent with deaggregation occurring.

EXAMPLE 7

Figure 5:
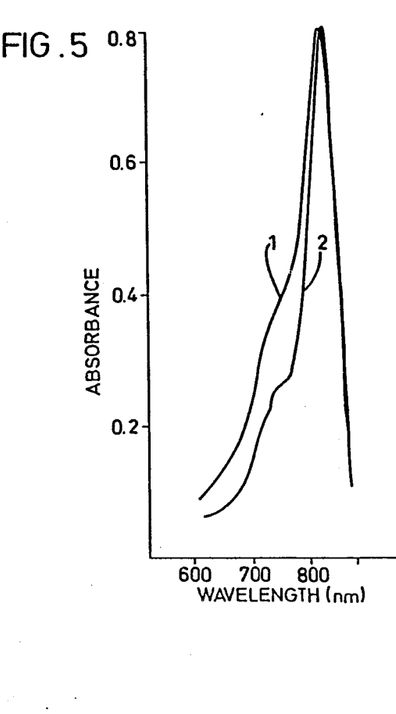
FIG. 5 is the UV/visible absorption spectra of Poly(N-vinylcarbazole) layers sensitized with the perchlorate salt and tri-iodide salt of Compound NO. 5.

Poly(N-vinylcarbazole) (PVK) layers sensitised with (1) the perchlorate salt and (2) the tri-iodide salt of Compound No. 5 were prepared by solvent coatings onto aluminised polyester film base. The dye concentration in each coating was 0.8% (w/w) and the layer thicknesses were 5 micrometers. Absorption spectra for the two layers are shown in FIG. 5 of the accompanying drawings in which the higher absorbance of short wavelength shoulder (measured at 750 nm) for the dye perchlorate sensitised layer (1) indicates a greater degree of dye association. The measured peak:shoulder ratios for the two spectra were (1) 2.2 and for (2) 3.6. The following Table compares the electrophotographic cycling stability of these layers under the following test conditions: 4 seconds charge (6 Kv corona/1 KV grid), 4 seconds dark decay, 10 seconds exposure (hot filament source supplying 4 milliwatts/cm$^2$ at the sample surface). Two seconds dark adaption was given between repeat cycles.

TABLE

| Cycle No. | Initial surface voltage variation on cycling | |
|---|---|---|
| | $ClO_4^-$ salt | $I_3^-$ salt |
| 1 | 265 | 355 |
| 2 | 192 | 337 |
| 3 | 170 | 337 |
| 4 | 156 | 335 |
| 5 | 143 | 332 |
| 6 | 135 | 330 |
| 7 | 125 | 330 |
| 8 | 120 | 332 |
| 9 | 117 | 330 |
| 10 | 115 | 330 |

The results clearly show how the tri-iodide ion assists maintenance of the initial surface voltage on repeated cycling.

The following Examples 8 to 14 illustrate the preparation of tri-iodide cyan dyes of the structures shown below. The structures of Intermediates A to C are also indicated.

-continued

EXAMPLE 8
Preparation of Cyanine Dye (12)

Into a 100 ml beaker were placed 20 ml of acetic acid, 15 ml of acetic anhydride, 0.866 g (0.005 mol) of 2-methylene-1,3,3-trimethylindolenine, 0.622 g (0.0025 mol) of Intermediate (A) and 0.4 g (0.061 mol) of sodium acetate. A magnetic stirrer was added, stirring was begun, and 1.00 g (0.006 mol) of potassium iodide was added. Heating was begun. As the temperature rose, the reaction mixture went from brown to green. Boiling for 30 minutes was followed by cooling. No crystals formed, so the solution was transferred to a flask and solvent removed at reduced pressure to afford a solid. Addition of ether was followed by filtration and washing of the solid with methanol to afford the dye as bronze crystals. The material was air dried to give 0.92 g (39%) of the desired dye; melting point=173° to 175° C. (compound turned from green to red between 130° to 140° C.). NMR was in agreement with the proposed structure. Mass spectrum of the compound gave a positive ion at 559 amu indicative of the cation portion of the molecule. Negative ions found at 127 and 381 amu are indicative of the tri-iodide anion.

EXAMPLE 9

Preparation of Cyanine Dye (13)

Into a 150 ml beaker were placed 25 ml of acetic acid, 25 ml of acetic anhydride, 1.810 g (0.005 mol) of 1-ethyl-5-nitro-2,3,3-trimethylindolenium iodide, 0.622 g (0.0025 mol) of Intermediate (A). A magnetic stirrer was added and stirring and heating were begun. Boiling for 30 minutes was followed by cooling, very little precipitate formed. Addition of ether resulted in precipitation of the dye. Filtration followed by washing and trituration with ether was followed by washing with a small amount of methanol to afford the dye as a dark blue powder. The material was air dried to give 0.57 g (22%) of the desired dye; melting point=234° C. IR and NMR were in agreement with the proposed structure. Mass spectrum of the compound gave a positive ion at 677 amu indicative of the cation portion of the molecule. An additional cationic peak at 769 amu indicates some of the chlorine in the central ring was replaced with iodine. Negative ions found at 127 and 381 amu are indicative of the tri-iodide anion.

EXAMPLE 10

Preparation of Cyanine Dye (14)

Into a 150 ml beaker were placed 25 ml of acetic acid, 25 ml of acetic anhydride, 1.810 g (0.005 mol) of 1-ethyl-5-nitro-2,3,3-trimethylindolenium iodide, 0.47 g (0.0025 mol) of Intermediate (B). A magnetic stirrer was added and stirring and heating were begun. Boiling for 30 minutes resulted in the formation of a green solution. Cooling, followed by addition of ether resulted in the precipitation of the dye. Filtration followed by washing and trituration with ether afforded the dye as a dark green-black powder. The material was air dried to give 0.81 g (33%) of desired dye; melting point=244° C. (dec). IR and NMR were in agreement with the proposed structure. Mass spectrum of the compound gave a positive ion at 615 amu indicative of the cation portion of the molecule. An additional cationic peak at 707 amu indicated some of the chlorine in the central ring was replaced with iodine. Negative ions found at 127 and 381 amu are indicative of the tri-iodide anion.

EXAMPLE 11

Preparation of Cyanine Dye (15)

Into a 150 ml beaker were placed 20 ml of acetic acid, 20 ml of acetic anhydride, 1.14 g (0.0025 mol) of 1-ethyl-5-phenylsulphonyl-2,3,3-trimethylindolenium iodide, 0.31 g (0.00125 mol) of Intermediate (A). A magnetic stirrer was added and stirring and heating were begun. Boiling for 30 minutes resulted in the formation of a green solution. Cooling to room temperature and cooling in ice was followed by filtration. Washing with a small amount of methanol and trituration with ether afforded the dye as bronze crystals. Concentration of the mother liquors and washings gave a second crop. The combined crops were air dried to give 0.96 g (61%) of the desired dye; melting point=166° C. IR and NMR were in agreement with the proposed structure. Mass spectrum of the compound gave a positive ion at 867 amu indicative of the cation portion of the molecule. An additional cationic peak at 959 amu indicated some of the chlorine in the central ring was replaced with iodine. Negative ions found at 127 and 381 amu are indicative of the tri-iodide anion.

EXAMPLE 12

Preparation of Cyanine Dye (16)

This dye was prepared in an identical manner to that for Cyanine Dye (15), but using 0.24 g (0.00125 mol) of Intermediate (B). The combined crops were air dried to give 0,96 g (65%) of the desired dye; melting point=279° C. IR and NMR were in agreement with the proposed structure. Mass spectrum of the compound gave a positive ion at 805 amu indicative of the cation portion of the molecule. An additional cationic peak at 897 amu indicated some of the chlorine in the central ring was replaced with iodine. Negative ions found at 127 and 381 amu are indicative of the tri-iodide anion.

EXAMPLE 13

Preparation of Cyanine Dye (17)

This dye was prepared in an identical manner to that for Cyanine Dye (15), but using 0.77 g (0.002 mol) of 1-butyl-5-nitro-2,3,3-trimethyl-indolenium iodide, 0.187 g (0.001 mol) of Intermediate (C) and 10 ml each of acetic acid and acetic anhydride. After cooling, filtration and washing with ether, methanol and ether again, dye was air dried to give 0.478 g (46%) of the desired dye; melting point=201° to 214° C. (dec). IR and NMR were in agreement with the proposed structure. Mass spectrum of the compound gave a positive ion at 671 amu indicative of the cation portion of the molecule. An additiional cationic peak at 763 amu indicated some of the chlorine in the central ring was replaced with iodine. Negative ions found at 127 and 381 amu are indicative of the tri-iodide anion.

EXAMPLE 14

Preparation of Cyanine Dye (18)

This dye was prepared in an identical manner to that for Cyanine Dye (15), but using 0.911 g (0.002 mol) of 1-ethyl-5-phenylsulphonyl-2,3,3-trimethyl indolenium iodide, 0.187 g (0.001 mol) of Intermediate (C) and 10 ml each of acetic acid and acetic anhydride. After cooling, filtration and washing with ether, methanol and ether again, dye was air dried to give 0.75 g (63%) of the desired dye. NMR was in agreement with the proposed structure. Mass spectrum of the compound gave a positive ion at 805 amu indicative of the cation portion of the molecule. An additional cationic peak at 897 amu indicated some of the chlorine in the central ring was replaced with iodine. Negative ions found at 127 and 381 amu are indicative of the tri-iodide anion.

We claim:

1. A photoconductor composition comprising an organic photoconductor compound in admixture with a sensitising dye characterised in that the sensitising dye is a cyanine dye having a polymethine chain of at least 7 carbon atoms and at least 10 molar percent of the dye is in the form of a tri-iodide salt.

2. A photoconductor composition as claimed in claim 1 characterised in that the polymethine chain includes a fused cyclopentene or cyclohexene ring.

3. A photoconductor composition as claimed in claim 1 characterised in that at least 50 molar percent of the dye is in the form of a tri-iodide salt.

4. A photoconductor composition as claimed in claim 3 characterised in that substantially all of the dye is in the form of a tri-iodide salt.

5. A photoconductor composition as claimed in claim 3 in which the sensitising dye has the general formula

(I)

in which:

n and m are 0 or integers such that (n+m) is at least 2, each $R^1$ independently represents a substituent of up to 20 carbon atoms selected from the optionally substituted acyclic hydrocarbon groups, alkaryl groups and aryl groups, A is selected from $-CH=CH-CH=$ and in which $R^2$ is selected from hydrogen, halogen, cyano, alkyl of up to 18 carbon atoms, alkoxy of up to 18 carbon atoms, phenoxy, aryl of up to 20 carbon atoms, amino, thiophenyl, thioalkyl of up to 18 carbon atoms, $R^{10}$ represents one or more substituents selected from alkyl groups of up to 4 carbon atoms, aryl of up to 20 carbon atoms, cyano, halogen and hydrogen, each Y is independently selected from S and $CR^3R^4$ in which $R^3$ and $R^4$ independently represent a substituted or non-substituted, aliphatic group of up to 20 carbon atoms, or $R^3$ and $R^4$ together represent the necessary atoms to complete a 5- or 6-membered carbocyclic ring, each Z independently represents one or more substituents selected from hydrogen, halogen, nitro, cyano, optionally substituted alkylsulphonyl, optionally substituted arylsulphonyl and optionally substituted arylcarbonyl, in which the alkyl and aryl groups contain up to 12 carbon atoms, and $X^-$ represents a tri-iodide anion.

6. A photoconductor composition as claimed in claim 5 characterised in that $R^1$ represents an alkyl group of 1 to 13 carbon atoms, Y represent $CR^3R^4$ and n=m=1.

7. A photoconductor composition as claimed in claim 5 characterised in that the dye is of the formula (II)

(II)

in which:

$X^-$ represents a tri-iodide anion, $R^{10}$ is as defined in claim 5, and $R^5$ represents $C_6H_5SO_2$, $CF_3SO_2$, $CH_3SO_2$, $NO_2$ or $C_6H_5OSO_2$.

8. A photoconductor composition as claimed in claim 1 characterised in that the photoconductor compound comprises a bis(benzo-[a]carbazolyl)aryl methane.

9. A photoconductor composition as claimed in claim 8 characterised in that the photoconductor compound comprises Bis-(N-ethylbenzo-1,2,-carbazolyl)phenyl methane.

10. A photoconductor composition as claimed in claim 3 characterised in that the sensitising dye is present in the range 0.01 to 10% by weight of the photoconductor and the composition additionally comprises a binder in an amount up to 85% by weight of the composition.

11. A photosensitive element comprising a support, the surface of which is electrically conducting or is made electrically conductive by the provision of a conductive layer, the electrically conductive surface having coated thereon a photosensitive layer characterised in that the photosensitive layer comprises a photoconductive material as claimed in claim 2.

* * * * *